Figure 1:
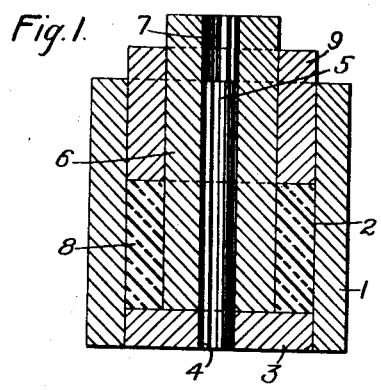

W. H. KEMPTON.
COMPOSITE MOLDING.
APPLICATION FILED APR. 4, 1919. RENEWED APR. 1, 1921.

1,392,174.

Patented Sept. 27, 1921.

WITNESSES:
J. A. Helsel.
O. E. Bee.

INVENTOR
Willard H. Kempton.
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

COMPOSITE MOLDING.

1,392,174.  Specification of Letters Patent.  Patented Sept. 27, 1921.

Original application filed July 25, 1918, Serial No. 246,763. Divided and this application filed April 4, 1919, Serial No. 287,580. Renewed April 7, 1921. Serial No. 459,309.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Composite Molding, of which the following is a specification; this being a division of application, Serial No. 246,763, filed July 25, 1918.

My invention relates to composite molding, and it has for its primary object the molding of composite articles by a method that will insure mechanical strength and the proper disposition of the employed material in the resulting article.

Heretofore, to the best of my knowledge, in molding articles in which a lubricant, such as graphite, is utilized, it has been customary to distribute the graphite throughout the entire structure of the article to be molded. On account of the low adhesive properties of the graphite, this distribution tends to reduce the mechanical strength of the molded article. In view of this, one object of my invention is to mold composite articles, containing graphite as a lubricant, so that the graphite shall be localized in that portion of the molded article requiring the lubricant and to minimize, in this way, the weakening effect of the graphite.

It is desirable that some articles, such, for instance, as machine elements, have self-lubricating qualities, and, at the same time, be non-conductors of electricity. In such instances the use of graphite, in any considerable quantity, as a lubricant is prohibited, if distributed throughout the entire structure of the article, for the reason that the graphite, being a good conductor, permits the passage of current through the article. Because of this, another object of my invention is to construct a composite molded article comprising two or more molding compositions, one of which contains graphite as a lubricant and the other of which is non-conducting, the compositions being so positioned, relative to each other, that the desired properties, both of insulation and lubrication are attained.

A further object of my invention is to construct a composite article, having the lubricant, employed in its composition, so localized as to reduce the amount of lubricant needed to insure proper efficiency.

A still further object of my invention is to employ a method of molding composite articles which may provide two working surfaces, one of which shall have a much higher co-efficient of friction than the other.

With these and other objects in view, my invention will be more fully described, illustrated in the drawings, in the several views of which corresponding numerals indicate like parts, and then particularly pointed out in the appended claims.

Figure 2:
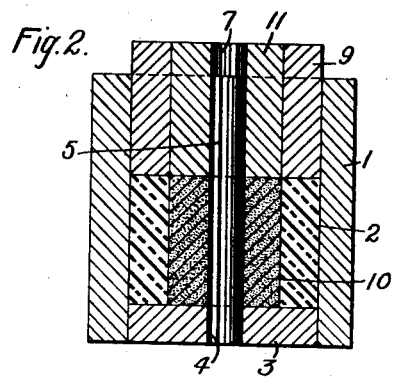
Figure 3:
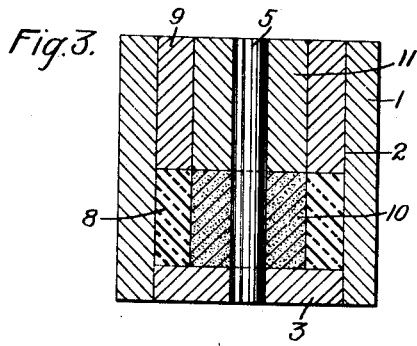
Figure 6:
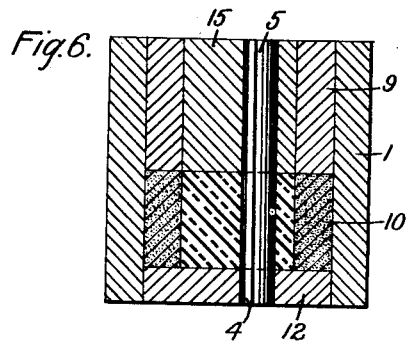
Figure 4:
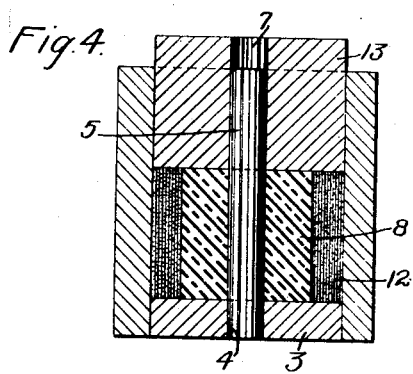
Figure 5:
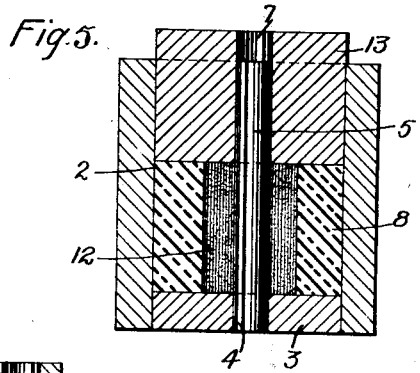
Figure 7:
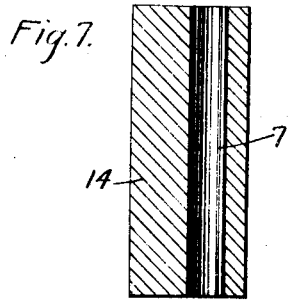

In the drawings, Figure 1 is a vertical section of a mold embodying my invention and showing the initial step in molding a composite article, such as a pulley or roller; Fig. 2 is a sectional view, similar to Fig. 1, in which the two materials employed in molding a composite article are shown positioned in the mold previous to the application of pressure to complete the compacting of the materials; Fig. 3 is a sectional view, similar to Fig. 2, showing the pressure members in their final positions; Fig. 4 is a sectional view, similar to Fig. 3, illustrating a modification of my invention; Fig. 5 is a sectional view of a mold which may be employed in constructing articles having a different disposition of materials therein; Fig. 6 is a sectional view, showing another slightly modified mold by which cams and articles of similar nature may be formed in accordance with my invention, and Fig. 7 is a sectional view of a member employed in place of one of the members shown in Fig. 6, during one step of my method.

In practising my invention, I may employ a mold in which a molding material having great mechanical strength, as well as insulating properties, may be positioned and slightly compressed about a spacing member which may be removed after the material about it has been slightly compressed. The subsequent removal of the spacing member provides an opening in which another material, having a lubricant uniformly distributed in it, may be placed, after which, pressure members, adapted to engage the two materials thus disposed in the mold, may be placed thereon and pressure exerted to compact both the materials into a hard unitary article. Heat may be applied throughout the entire molding process or after the materials have been compressed, as seems most desirable. The positioning and treatment of the materials placed in the mold will be more fully described in the following paragraphs.

In Fig. 1 is shown a mold body 1, having a chamber 2 opening through its ends and closed at one end by a removable bottom 3 having an opening 4 in which one end of a centering pin or rod 5 may be placed. If the composite article, to be molded in accordance with my invention, is in the nature of a pulley or roller requiring a cylindrical axial opening, the bottom 3 will be provided with a central opening 4 in which one end of the rod 5 may be placed, thus disposing the rod axially of the chamber 2. A spacing member or sleeve 6, having an opening 7 to receive the rod 5, may then be slipped over the rod 5, and molding material 8 may be placed around the spacing member 6 to rest on the bottom 3 and fill the space between the mold body 1 and sleeve 6 to the desired depth. A pressure ring 9 may then be placed between the spacing member 6 and the inner wall of the mold 1 and pressure may be applied to this ring to compress the material sufficiently to compact it, as shown in Fig. 1, so that, when the spacing member 6 is removed, the material will retain its position and form.

Another molding material 10, containing a lubricant, such as graphite, may now be placed in the space provided by removing the spacing member 6 and a pressure member or ring 11 similar to the pressure member 9 may be placed about the rod 5 to engage the material last added and, with the member 9 and rod 5, completely close the top of the chamber 2, whereby pressure may be applied to the entire surface of the material disposed in the mold. Pressure may then be applied uniformly to the pressure members 9 and 11, while the mold is heated, thus compressing the two materials in the mold to form a solid unitary body.

In molding articles of the above described character, the material 8, which is first positioned in the mold and subjected to slight compression, may be a shredded material, a fabric, a loose fibrous material, such as cotton batting, or a granular or finely divided material, such as wood flour, the material, whatever it may be, being impregnated with a suitable binder such, for example, as a phenolic condensation product. When loose material is employed, an initial pressure, transmitted by the pressure member 9, is essential to compact the material 8 so that it will retain its position and shape when the spacing member 6 is removed. The material 10, which is employed to partially fill the space provided by the removal of the spacing member 6, may be the same as the material 8, with a lubricant, such as graphite, distributed through it.

The mold shown in Fig. 4 may be employed to construct an article composed of material of a different character than the material above mentioned. The material 12 may be a fibrous sheet material such as paper, duck or muslin, impregnated with a binder containing a lubricant. The material 12 may be wound to form a tube of such proportions that, when placed in the mold 1, it will engage the wall of the mold and remain in spaced relation to the centering rod 5. On account of the ability of the material 12, which is first placed in the mold 1, to maintain its position and shape, the mold 1 differs from the molds shown in Figs. 1 to 3 inclusive in that no spacer member is needed and the pressure member 13 replaces both the pressure members 9 and 11. The material 8, which may be utilized to fill the space between the rod 5 and the material 12, may be a loose fibrous material or a sheet material, impregnated with a suitable binder, such as a phenolic condensation product. If the material 8 is a sheet material, it may be wound to form a tube of proper dimensions. The pressure member 13, having a central opening 7, may be slipped over the rod 5 to engage the materials disposed in the mold 1 and pressure applied thereto, while the mold is heated, to compact the materials into a hard and unitary body.

The mold shown in Fig. 5 corresponds, in detail, to the mold illustrated in Fig. 4, this view being employed in order to illustrate another disposition of materials in the mold. In this case, the material 12 may be wound about the centering rod 5 to a suitable thickness and placed in the mold so that a space is reserved between the material 12 and the wall of the mold 1 which may be filled by the material 8. The pressure member 13 may then be placed on the materials in the mold 1 and pressure and heat may be applied to compact the materials into a hard and unitary body.

Fig. 6 illustrates one type of mold embodying my invention which may be employed in constructing cams and articles of a similar nature. Fig. 7 shows the spacing member 14 which replaces the spacing member 6, shown in Fig. 1, and has the opening 7 so formed as to be in alinement with the eccentrically located opening 4 in the bottom 12, corresponding to the bottom 3. The spacing member 14 may be slipped over the centering rod 5, and the material 10, which is the material containing the lubricant, may be placed in the mold 1 and subjected to slight compression transmitted by the pressure member 9. The spacing member 14 may then be removed and the material 8 disposed in the space provided thereby. The pressure member 15, which corresponds in shape to the spacing member 14 but is of less length, may be positioned about the centering rod 5 so that, in conjunction with the pressure member 9, pressure may be applied to compact the materials in the mold, heat being applied either during or after this compression.

It is obvious that, although the molds described and illustrated in drawings are cylindrical, various shapes may be employed, especially in the construction of self-lubricating gears or cams which must have irregular surfaces.

Although I have specifically described several modifications of my method of molding composite articles, such as pulleys and cams, having a lubricant disposed in their structure, it is obvious that minor changes may be made in the construction of the mold and the disposition of the materials therein to permit molding of other machine elements, such as gears, without departing from the spirit of my invention and I desire, therefore, that no limitations shall be imposed except such as are indicated in the appended claims.

I claim as my invention:

1. A method of molding composite articles that comprises impregnating fibrous sheet material with a binder containing a lubricant, superimposing convolutions of the sheet material to form a tubular body, disposing the tubular body in a mold, reserving a space therein, placing another material impregnated with a binder in the reserved space and subjecting the two materials to heat and pressure to compact them and to harden the binder.

2. A method of molding composite articles that comprises impregnating a sheet material with a binder containing a lubricant, superimposing convolutions of the sheet material to form a tubular body of such dimensions as to fit within the chamber of a mold body, so disposing the tubular body in a mold having a rod which extends through its molding chamber as to engage the interior faces of the mold's wall and leave a space between the inner periphery of the tubular body and the rod extending through the mold chamber, filling the reserved space with a material impregnated with a binder and subjecting the two materials to heat and pressure to compact them and to harden the binder.

3. A method of molding composite articles that comprises impregnating a sheet material with a binder containing a lubricant, winding a plurality of layers about a rod adapted to seat in an opening in a closing member of a mold chamber, disposing the rod with the surrounding material in position in the molding chamber, reserving a space between the periphery of the wound material and the wall of the mold chamber, filling the reserved space with a material impregnated with a binder and subjecting the materials thus disposed in the molding chamber to heat and pressure to compact them and to harden the binder.

4. A method of molding composite articles that comprises separately disposing substantially tubular bodies of different moldable compositions in a substantially annular mold chamber, with one body surrounding another, and applying axial pressure against the bodies, together with heat, to compact and cure the compositions, whereby a unitary composite article is formed.

5. A method of molding composite articles that comprises separately disposing substantially tubular bodies one of which is composed of superimposed layers of sheet material impregnated with a binder containing a lubricant and the other of which is composed of a comminuted material mixed with a binder in a substantially annular mold chamber, with one of the bodies surrounding the other, and applying axial pressure against them, together with heat, to compact the material and to harden the binder, whereby a unitary composite article is formed.

6. A method of molding composite articles that comprises compacting a substantially tubular body of a moldable composition in a substantially annular mold chamber while reserving a substantially annular space in the chamber substantially concentric with respect to the body, placing a body of a different moldable composition in the reserved space and applying heat and pressure to the two bodies to form a unitary article.

7. A method of molding composite articles that comprises compacting a substantially tubular body of comminuted material mixed with a binder in a substantially annular mold chamber while reserving a substantially annular space in the chamber substantially concentric with respect to the body, placing a body of a different moldable composition in the reserved space and applying heat and pressure to the two bodies to form a unitary article.

8. A method of molding composite articles that comprises compacting a substantially tubular body of comminuted material mixed with a binder in a substantially annular mold chamber while reserving a substantially annular space in the chamber substantially concentric with respect to the body, placing a body of superimposed layers of sheet material impregnated with a binder in the reserved space and applying heat and pressure to the two bodies to form a unitary article.

In testimony whereof, I have hereunto subscribed my name this 22nd day of March, 1919.

WILLARD H. KEMPTON.